J. P. BRYAN.
Machine for Cutting Sugar Cane.
No. 3,158.
Patented July 8, 1843.
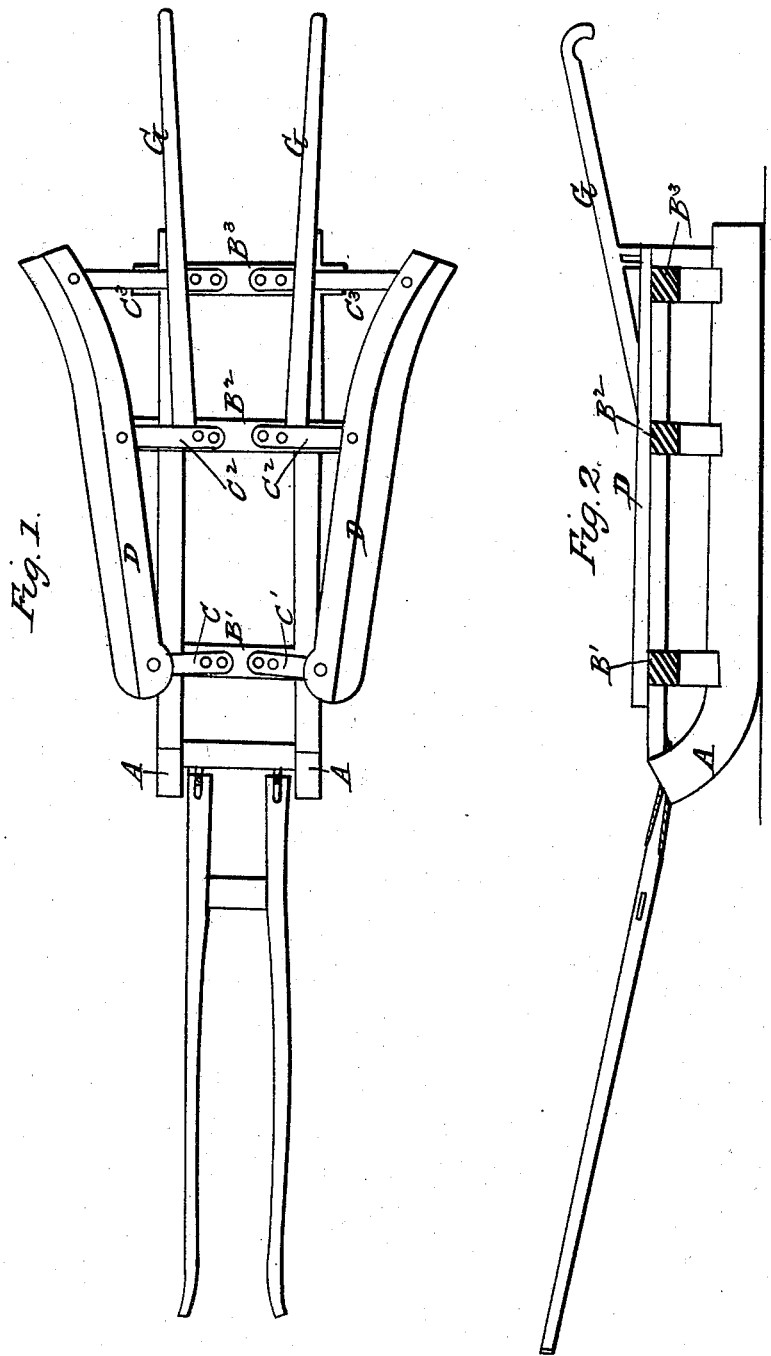

UNITED STATES PATENT OFFICE.

JOHN P. BRYAN, OF PRINCETON, KENTUCKY.

IMPROVEMENT IN CANE-CUTTERS.

Specification forming part of Letters Patent No. 3,158, dated July 8, 1843.

*To all whom it may concern:*

Be it known that I, JOHN P. BRYAN, of Princeton, in the county of Caldwell and State of Kentucky, have invented a new and useful Machine for Cutting Sugar-Cane with Horse-Power, called "Bryan's Patent Cane-Cutter;" and I hereby declare that the following is a full, clear, and exact description of the construction and operation of the same, reference being had to the annexed drawings, making a part of this specification.

The machine consists of two knives, D, each seven feet long and eight inches wide, made of best steel, the edges being straight for one half their length, the other half forming a curve, so that at the termination the point shall be brought out eight inches perpendicular from a prolongation of the straight line, the colored part in the drawing, four inches wide, being three-eighths of an inch thick, the other four inches of the width forming the blade, being beveled to the edge on one side, with two holes in the thicker part to receive the support of iron braces $C^2 C^3$, running in upon the cross-frame of the carriage hereinafter described, for the purpose of extending or contracting the sphere of the knives according to the distances of the rows of cane. These knives are secured to a carriage or sled, A, which would be perfectly represented by a pair of sleigh-runners. Across these runners are placed three pieces of plank, $B' B^2 B^3$, to the front one of which, $B'$, on each side, are secured, with arms $C'$ and bolts, the heads of the knives, and to the other two, $B^2 B^3$, the braces $C^2 C^3$, by which it is intended to extend and contract them, the cross-planks and iron braces being pierced with corresponding holes to keep the knives in the desired position. The carriage will be from eight to twelve inches high, according to the depth of the furrow, and will present the knives with a very oblique stroke at the cane just at the surface of the earth, the machine to be drawn by a horse in shafts and directed by a man behind, who will govern it with handles, as with a plow.

What I claim as my invention, and desire to secure by Letters Patent, is—

The form of the knives D, their oblique application, and the method of arranging them in conjunction with the runners or carriage A, as above specified and described.

JNO. P. BRYAN.

Witnesses:
  B. LATHROP,
  FRS. ROBERTS.